US008787882B2

(12) United States Patent
Akhtar

(10) Patent No.: US 8,787,882 B2
(45) Date of Patent: Jul. 22, 2014

(54) RESOURCE PROFILE ADJUSTMENT FOR PRE-FETCHING OF ASSETS TO USER EQUIPMENT

(75) Inventor: Shahid Akhtar, Richardson, TX (US)

(73) Assignee: Alcatel Lucent, Boulogne Billancourt (FR)

( * ) Notice: Subject to any disclaimer, the term of this patent is extended or adjusted under 35 U.S.C. 154(b) by 657 days.

(21) Appl. No.: 12/964,578

(22) Filed: Dec. 9, 2010

(65) Prior Publication Data

US 2012/0149417 A1    Jun. 14, 2012

(51) Int. Cl.
H04L 12/58    (2006.01)
H04M 1/725    (2006.01)

(52) U.S. Cl.
USPC ....... 455/412.1; 455/3.01; 455/3.03; 707/609

(58) Field of Classification Search
USPC .............. 455/3.01–3.06, 412.1–414.4, 556.1, 455/556.2, 509; 707/609, 802; 709/203, 709/246; 715/733, 864–866
See application file for complete search history.

(56) References Cited

U.S. PATENT DOCUMENTS

| 7,103,369 | B2 * | 9/2006 | Sato et al. | 455/456.3 |
|---|---|---|---|---|
| 8,036,690 | B1 * | 10/2011 | Delker et al. | 455/512 |
| 8,131,875 | B1 * | 3/2012 | Chen et al. | 709/246 |
| 8,335,760 | B1 * | 12/2012 | Kumar et al. | 707/609 |
| 2001/0014867 | A1 * | 8/2001 | Conmy | 705/9 |
| 2004/0215757 | A1 * | 10/2004 | Butler | 709/223 |
| 2007/0061245 | A1 | 3/2007 | Ramer et al. | |
| 2007/0150816 | A1 * | 6/2007 | Hariki | 715/733 |
| 2008/0200161 | A1 * | 8/2008 | Morse et al. | 455/418 |
| 2009/0210481 | A1 * | 8/2009 | Fletcher et al. | 709/203 |
| 2010/0100607 | A1 | 4/2010 | Scholz et al. | |
| 2010/0198944 | A1 * | 8/2010 | Ho et al. | 709/217 |
| 2011/0136474 | A1 * | 6/2011 | Ren et al. | 455/412.2 |

OTHER PUBLICATIONS

Werner Routsalainen, "The Multiplatform Podcasting/Podcatching Bibble-the Chart", Internet Citation, Aug. 28, 2008, pp. 1-19, XP002671657, Retrieved from Internet: URL: http://www.smartphonemag.com/cms/print/54357 [retrieved on Mar. 16, 2012].
erner Routsalainen, "The Multiplatform Podcasting/Podcatching Bibble", Internet Citation, Aug. 28, 2008, pp. 1-19, XP002671658, Retrieved from Internet: URL: http://www.winmobiletech.com/082008podcasting/t.html [retrieved on Mar. 16, 2012].
Loon T. S. et al., "Alleviating the latency and bandwidth problems in WWW browsing", Proceedings of the Usenix Symposium on Internet Technologies and Systems, xx, xx, Dec. 8, 1997, pp. 219-230, XP002109263.

* cited by examiner

Primary Examiner — Sujatha Sharma
(74) Attorney, Agent, or Firm — Duft Bornsen & Fettig, LLP

(57) ABSTRACT

Systems and methods are disclosed for adjusting resource profiles which are used by user equipment (UE) to pre-fetch assets from content providers. In one embodiment, a recommender system receives a resource profile from a UE. The resource profile indicates content providers that have assets for the UE to download in advance during a pre-fetch operation. The resource profile also defines a percentage of UE resources allocated to each of the content providers for downloading the assets during the pre-fetch operation. The recommender system then adjusts the percentages of the UE resources in the resource profile for the end user to generate an updated resource profile for the end user, and transmits the updated resource profile to the UE for use in one or more subsequent pre-fetch operations.

20 Claims, 10 Drawing Sheets

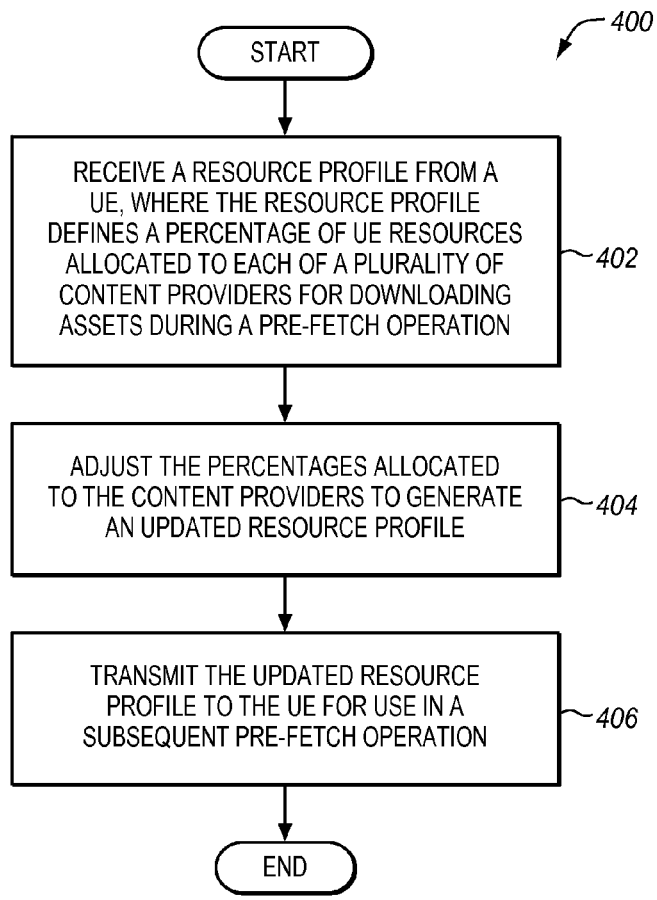
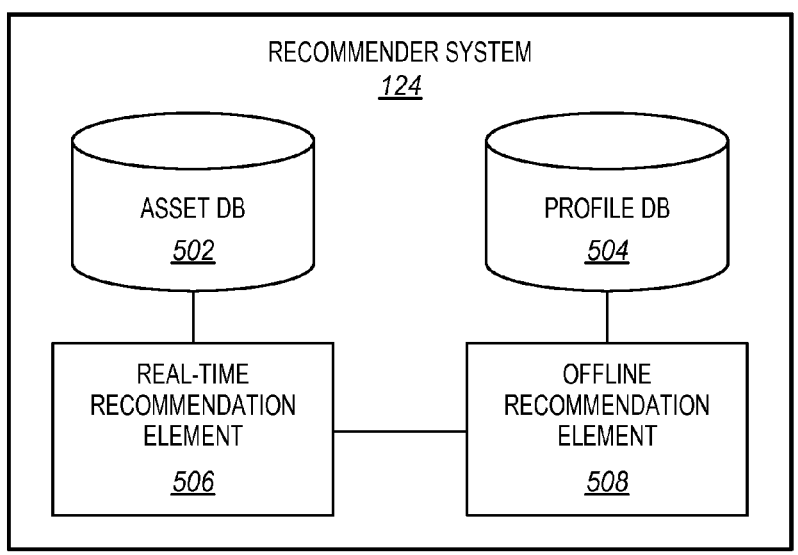

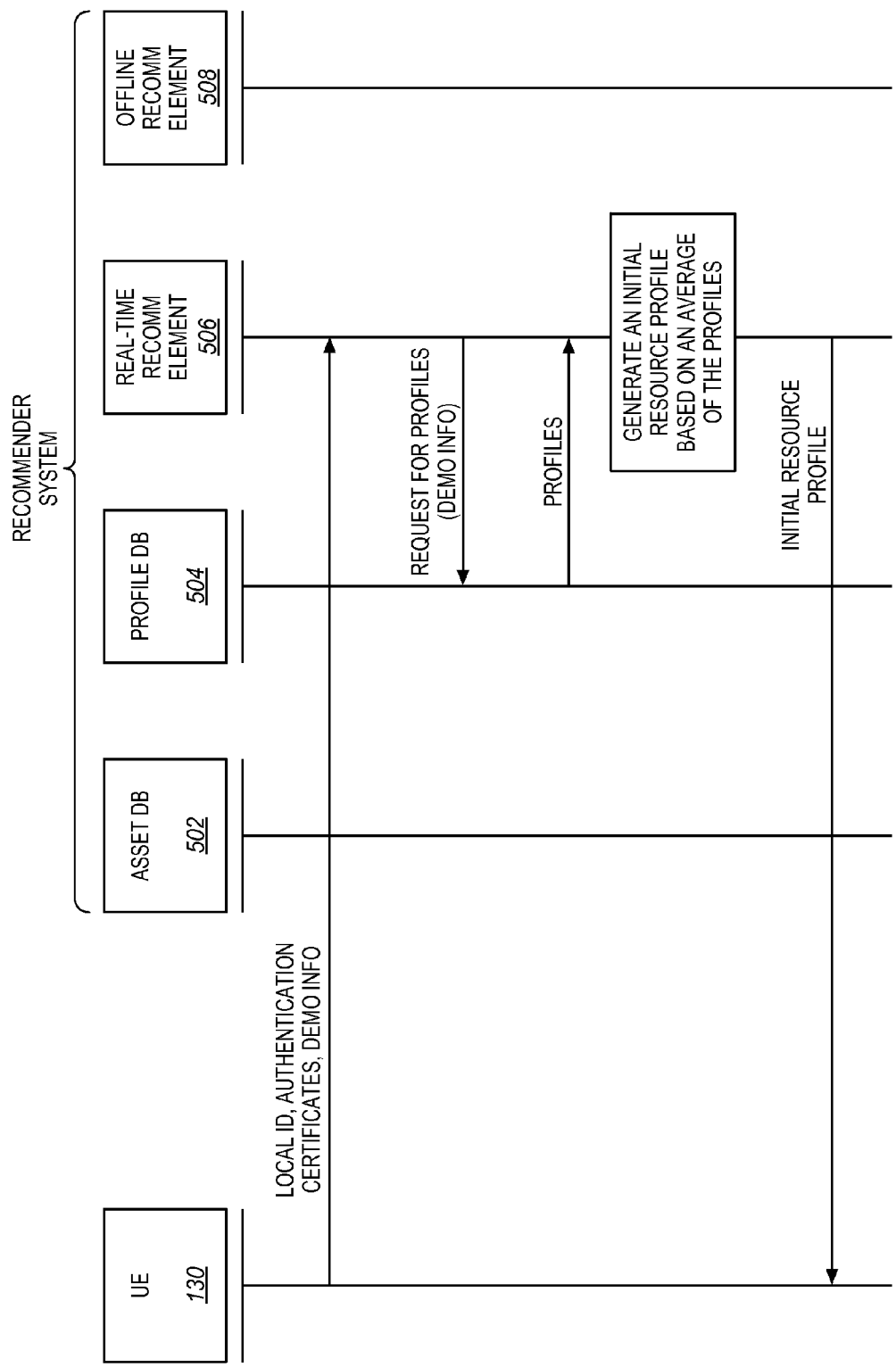

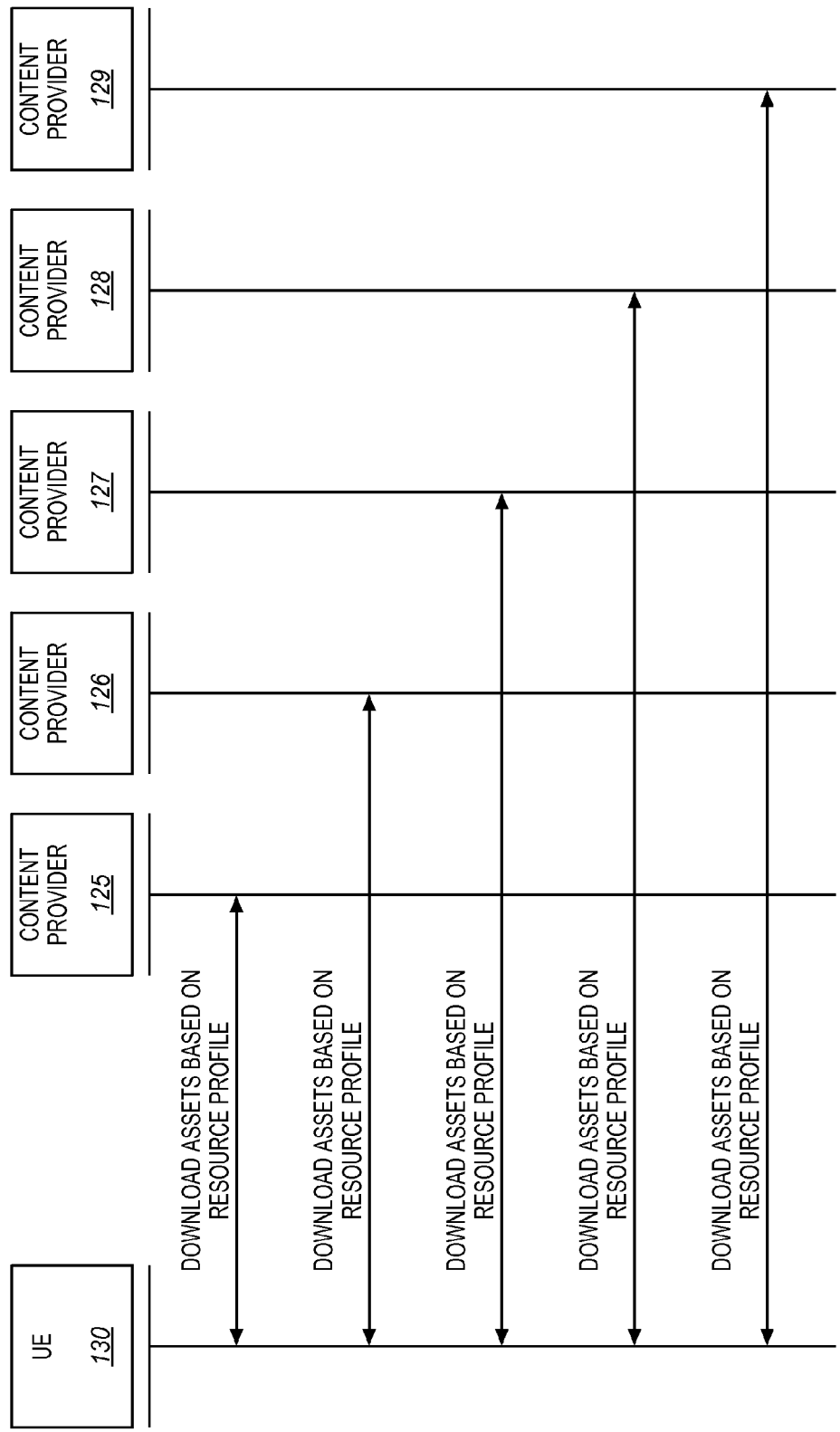

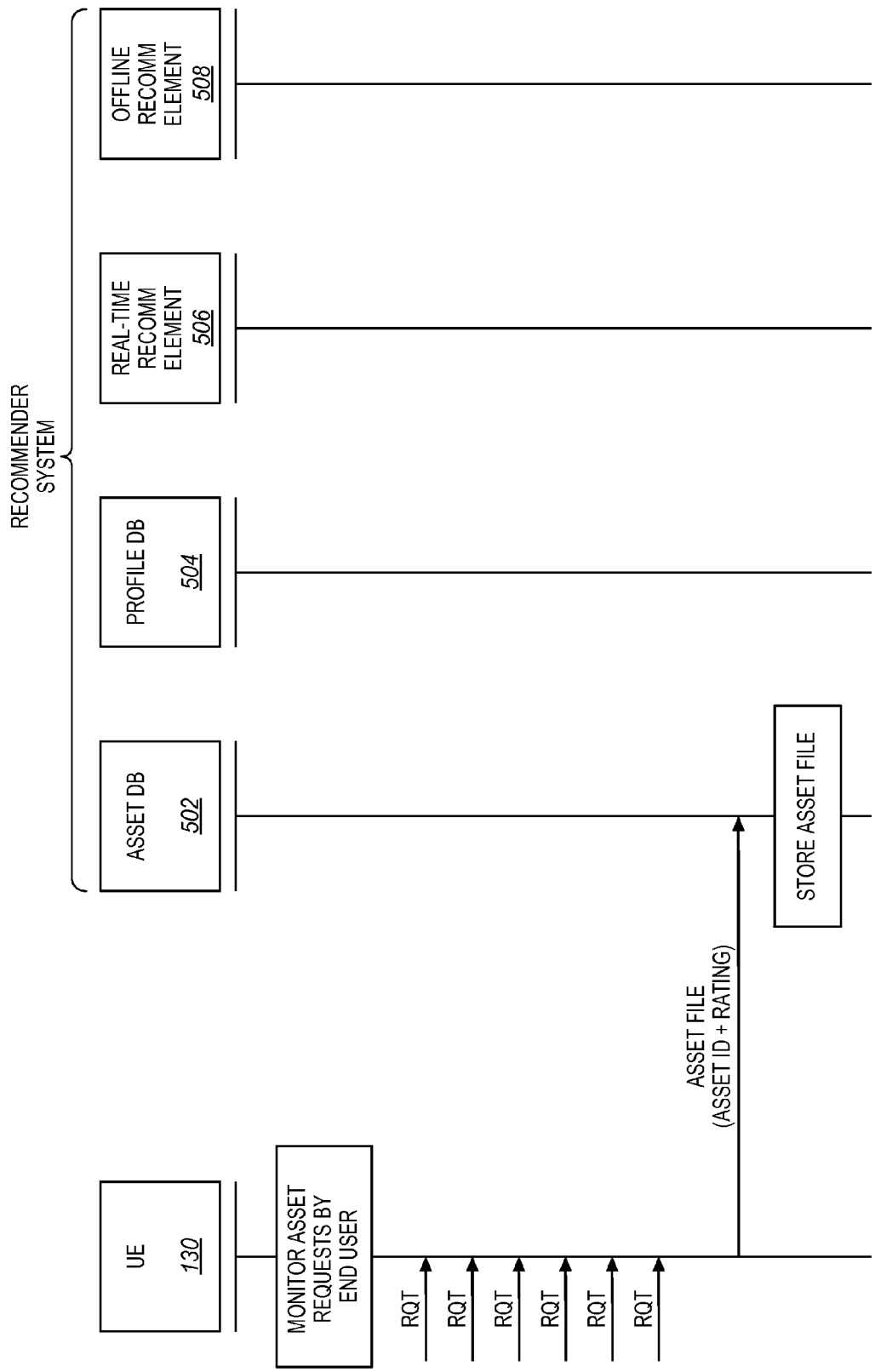

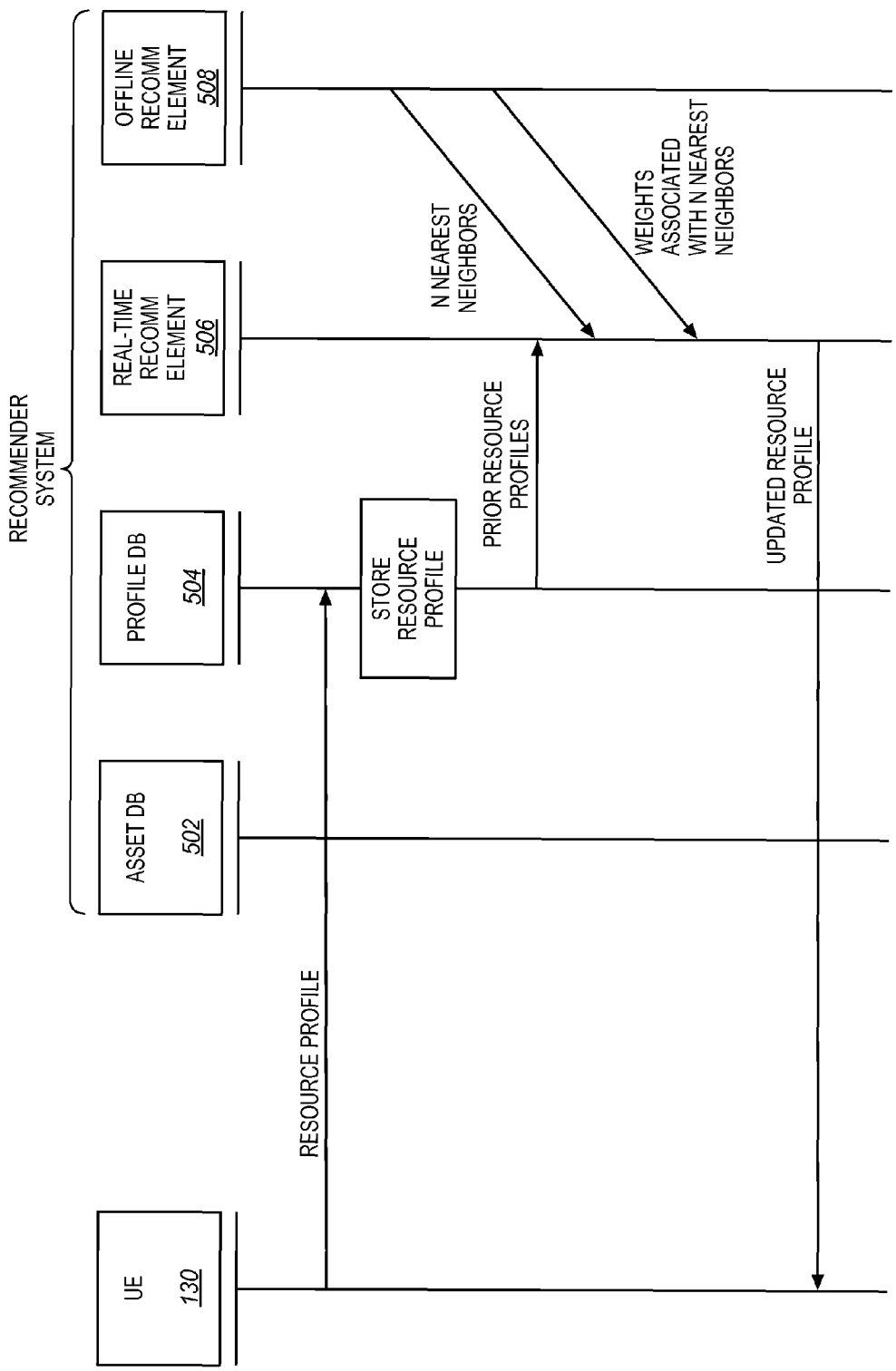

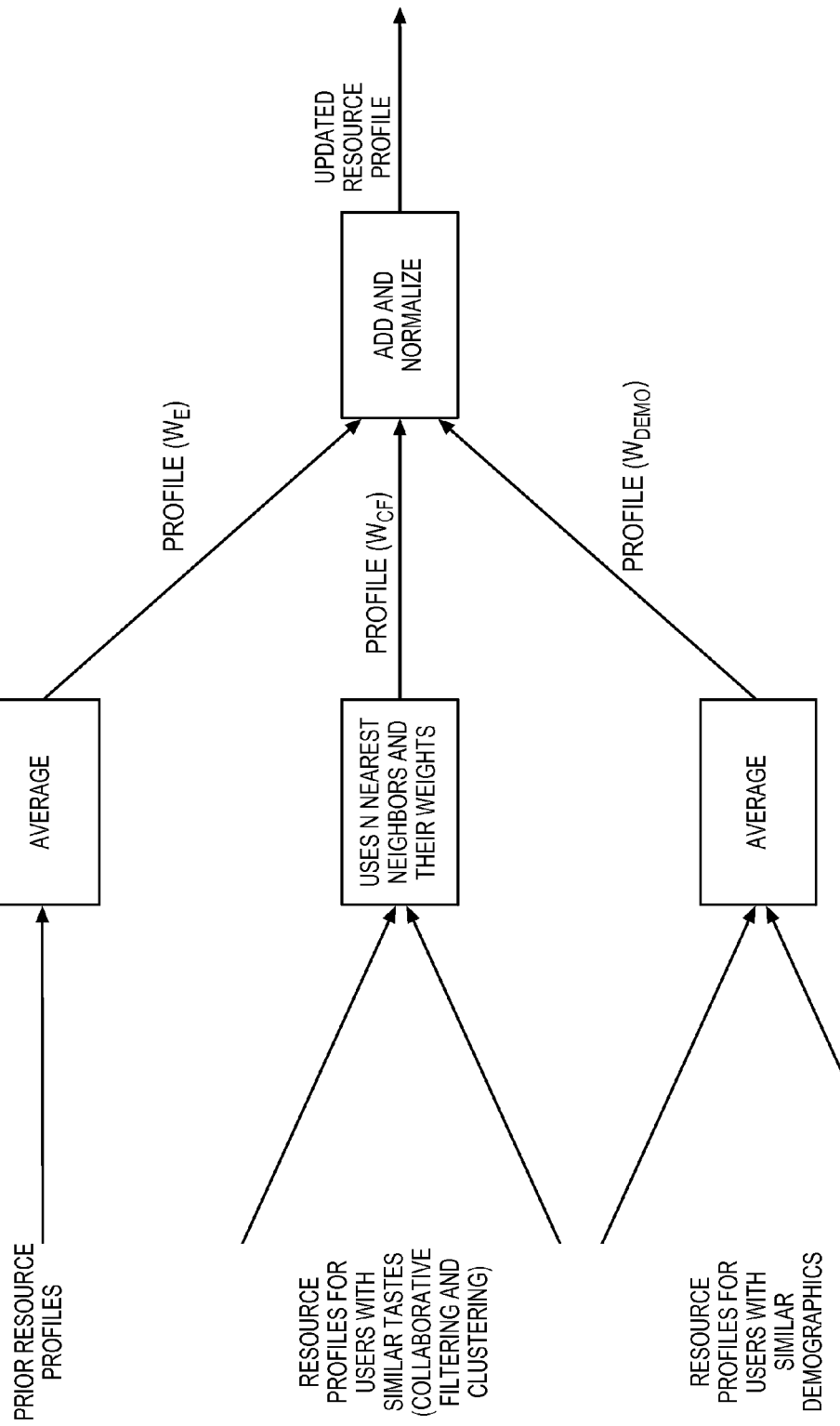

RESOURCE PROFILE ADJUSTMENT FOR PRE-FETCHING OF ASSETS TO USER EQUIPMENT

FIELD OF THE INVENTION

The invention is related to the field of communication systems and, in particular, to adjusting a resource profile of user equipment (UE) that is used in pre-fetch operations for downloading assets to the UE.

BACKGROUND

Mobile networks (also referred to as wireless or cellular networks) include a plurality of base stations that use radio signals to communicate with mobile devices, which may be referred to User Equipment (UE). A base station includes transceivers (antennas) having a particular transmission range which form "cells" around the base station. When a UE comes into range of a cell of the base station, the UE is able to exchange radio signals with the base station. The base station in turn interfaces the UE with a core network that offers voice and/or data services to the UE. For example, the base station may interface the UE with an Evolved Packet Core (EPC) network of the Long Term Evolution (LTE) standards or another type of core network so that the UE may download content from websites.

As data services have emerged due to 3G and 4G technologies, the use of data services by subscribers has increased. For example, mobile subscribers tend to access data services, such as web surfing, email, etc., more than they use voice services. Data services allow end users to download content from content servers, some examples of which are Facebook, YouTube, NetFlix, etc. Network operators are faced with the problem of providing adequate bandwidth to its subscribers as the use of data services increases. The air interface of a mobile network may be a bottleneck for increasing bandwidth because there is a limited radio spectrum that may be used for communications. Thus, network operators look for ways to save bandwidth over the air interface.

SUMMARY

Embodiments described herein further optimize how the bandwidth of the air interface is utilized in a mobile network by adjusting how resources in a UE are allocated to particular content providers for downloading content from the content providers in advance. One technique that may be used to save bandwidth on the air interface is to predict content that may be requested by an end user of a UE, and download that content to the UE in advance of the request. For example, if there is a popular video on YouTube, then a system in the network may predict that the end user is going to download the video at some point. Thus, the UE may download the video from the YouTube server in advance, and store the video locally. If the end user of the UE later requests to view the video, then the UE is able to retrieve the video from local memory. The UE does not have to download the video from the YouTube server in real time. The UE downloads the content at an optimal time or via a local wireless network (e.g., WiFi), such as when there is low usage of the air interface (e.g., late at night), or using a low priority (e.g., best efforts) so that the download has less of an effect on the air interface. Thus, the bandwidth of the air interface is used in a more intelligent manner by downloading the content in advance to the UE.

The process of downloading content to a UE in advance of an end user actually requesting or viewing the content is referred to as pre-fetching. A UE may be programmed or otherwise adapted to initiate a pre-fetch operation periodically, such as daily, weekly, etc. For a pre-fetch operation, a resource profile is established for the end user of the UE, and the UE processes the resource profile to identify the content providers (e.g., websites) that have content (e.g., videos) for the UE to download in advance, and to determine how to allocate resources for downloading the content from the content providers. The content, such as video, audio, etc., is referred to generally herein as "assets". Thus, the resource profile for the UE indicates the content providers that have assets for the UE to download in advance for a pre-fetch operation. The resource profile also defines a percentage of UE resources (e.g., time spent downloading or memory) allocated to each of the content providers for downloading the assets during the pre-fetch operation. A percentage of UE resources allocated to a content provider may refer to the percentage allocated to the content provider itself (regardless of the type of asset downloaded) and/or may refer to the percentage of UE resources allocated per asset-type or per asset sub-type from the content provider. For example, the resource profile may indicate that 40% of UE resources are allocated to a first content provider during the pre-fetch operation (regardless of the type of asset being downloaded). The resource profile may also indicate that 20% of UE resources are allocated to the first content provider for video downloads, 15% of UE resources are allocated to the first content provider for audio downloads, and 5% of UE resources are allocated to the first content provider for digital picture downloads.

According to one embodiment, a recommender system is used to adjust the percentages allocated in the resource profile for an end user. The recommender system receives a resource profile for an end user from a UE. The resource profile defines a percentage of UE resources allocated to each of the content providers for downloading the assets during a pre-fetch operation. For example, the resource profile may indicate that 40% of UE resources are allocated to a first content provider during the pre-fetch operation, that 20% of UE resources are allocated to each of a second and third content provider, and that 10% of UE resources are allocated to each of a fourth and fifth content provider during the pre-fetch operation. The recommender system then adjusts the percentages of UE resources allocated to the content providers to generate an updated resource profile. The recommender system may adjust the percentages allocated in the resource profile based on percentages in prior resource profiles for the end user, and/or based on percentages in resource profiles of other end users having similarities to the end user (e.g., similar tastes, similar interests, similar demographics, etc). The recommender system then transmits the updated resource profile, having the adjusted percentages, to the UE. The UE initiates one or more subsequent pre-fetch operations using the updated resource profile.

The process of updating the resource profile for the end user may be performed in an iterative manner so that the percentages allocated in the resource profile are continually updated. As the recommender system obtains more data about the percentages in resource profiles of other users, the percentages allocated in the resource profile of the end user become optimized. With the percentages optimized, the air interface of the mobile network will be used more efficiently when a UE pre-fetches assets from content providers and downloads fewer assets during peak times.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

FIG. 4 is a flow chart illustrating a method of adjusting a resource profile in an exemplary embodiment.

FIG. 5 illustrates a recommender system in an exemplary embodiment.

FIG. 6 is a message diagram illustrating an initial authentication of a UE in an exemplary embodiment.

FIG. 7 is a message diagram illustrating a pre-fetch operation in an exemplary embodiment.

FIG. 8 illustrates user equipment (UE) sending asset information to an asset database in an exemplary embodiment.

FIG. 9 is a message diagram illustrating a UE sending a resource profile to a recommender system for updating in an exemplary embodiment.

FIG. 10 illustrates an updating routine in an exemplary embodiment.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
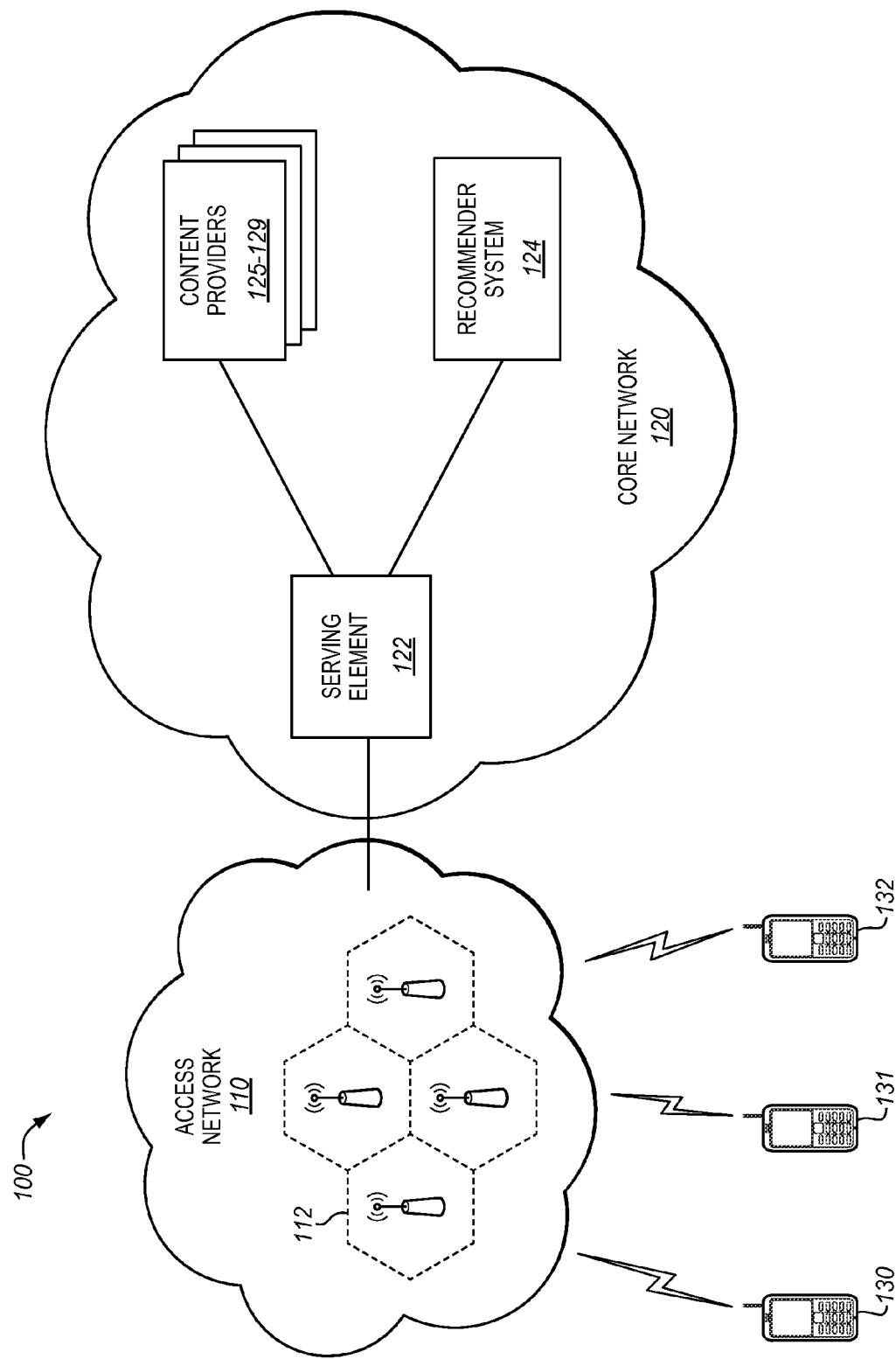
FIG. 1 illustrates a mobile network in an exemplary embodiment.

FIG. 1 illustrates a mobile network 100 in an exemplary embodiment. Mobile network 100 includes an access network 110 coupled to a core network 120. Access network 110 includes a plurality of base stations 112 (or other types of wireless access points) that exchange wireless or radio signals with UEs 130-132 using the over-the-air (OTA) interface. Core network 120 is the central part of the network that provides voice and/or data services to the UEs 130-132 that are connected by access network 110. Core network 120 may comprise a packet-switched core network, such as an Evolved Packet Core (EPC) of a Long Term Evolution (LTE) network, or may comprise any other type of core network.

Core network 120 includes one or more serving elements 122, a recommender system 124, and a plurality of content providers 125-129. Serving element 122 comprises any server or system operable to serve a UE accessing voice and/or data services. For example, serving element 122 may comprise a packet switch, a serving gateway (S-GW), a PDN Gateway (P-GW), or similar type of element. Recommender system 124 comprises any server or system operable to adjust a resource profile of a UE 130-132, and more particularly, to adjust percentages of UE resources allocated to each of content providers 125-129 for pre-fetch operations. Recommender system 124 may be further operable to predict assets that end users of UEs 130-132 may request to download from content providers 125-129. Content providers 125-129 comprise any servers or systems operable to store video, audio, digital pictures, files, or any other type of downloadable content. The content that is downloadable to a UE 130-132 is referred to herein as "assets". One example of a content provider 125-129 is a server which hosts a website having assets that are offered to a UE. For instance, a server may host the YouTube website which offers videos for download. Content providers 125-129 are shown as part of core network 120, which is merely to illustrate that content providers 125-129 are accessible to UEs 130-132 through core network 120. Content providers 125-129 may actually be separate from core network 120, and accessible through an appropriate gateway (not shown) within core network 120.

UEs 130-132 are each operable to communicate with access network 110 to receive services from core network 120. More particularly, UEs 130-132 are able to download assets from content providers 125-129 and/or upload assets to content providers 125-129. UEs 130-132 are mobile devices in this embodiment which use wireless or radio signals to communicate with access network 110.

Figure 2:
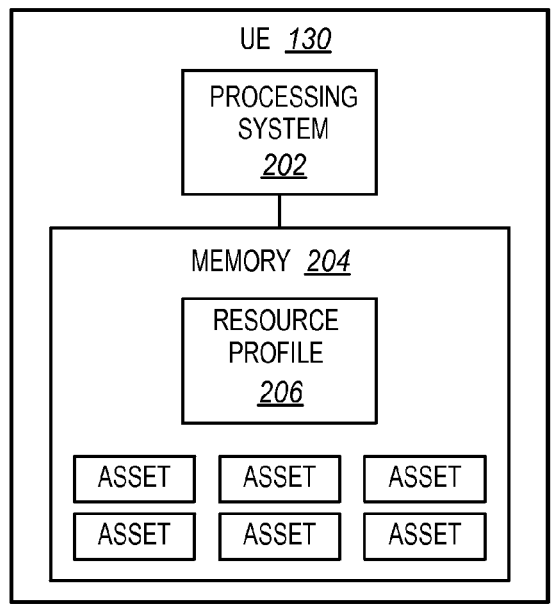
FIG. 2 illustrates user equipment (UE) in an exemplary embodiment.

FIG. 2 illustrates UE 130 in an exemplary embodiment. FIG. 2 shows an exemplary configuration of UE 130, and other UEs 131-132 in FIG. 1 may have similar configurations. UE 130 is programmed to execute a pre-fetch operation in order to download assets from content providers 125-129 in advance of an end user actually requesting the assets. UE 130 includes a processing system 202 and a memory 204. Processing system 202 comprises one or more processors that control the operation of UE 130. Processing system 202 may interface with a subscriber identity module (SIM) card or other type of programmable card which indicates the services subscribed to by the end user. Memory 204 comprises any type of storage device that stores data. Memory 204 is able to store assets that are downloaded in advance by pre-fetch operations. Memory 204 is also able to store a resource profile 206 for UE 130. Resource profile 206 indicates content providers 125-129 that have assets for UE 130 to download in advance during a pre-fetch operation. Resource profile 206 also defines a percentage of UE resources allocated to each of the content providers 125-129 for downloading the assets during the pre-fetch operation.

Figure 3:
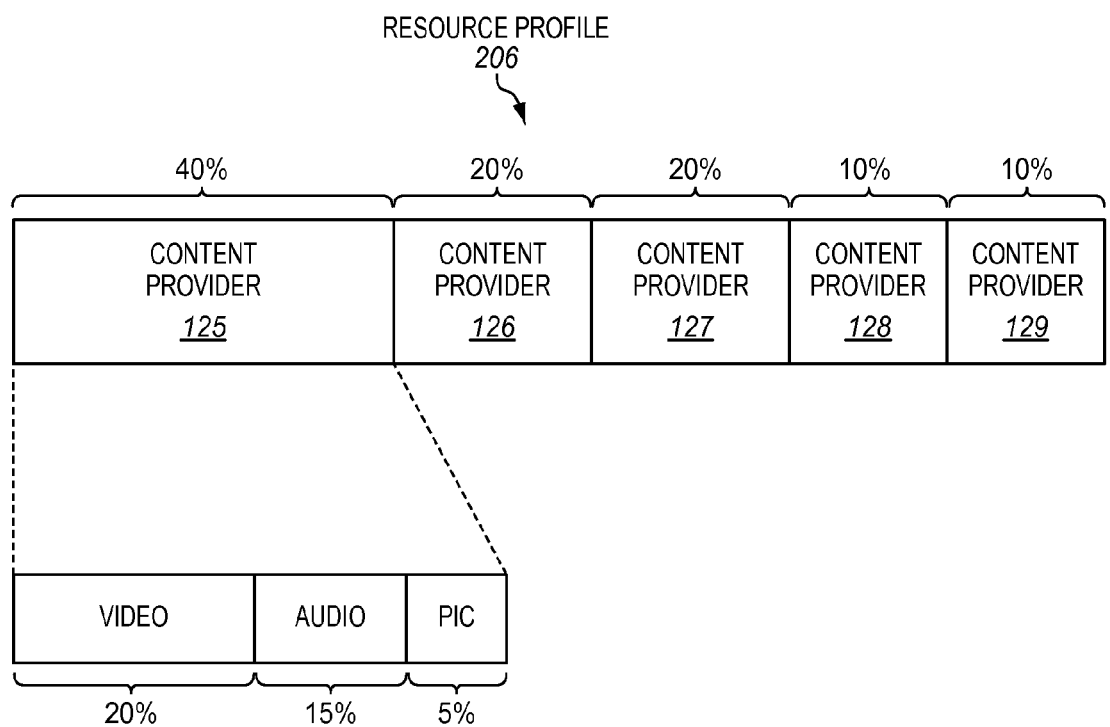
FIG. 3 illustrates a resource profile in an exemplary embodiment.

FIG. 3 illustrates resource profile 206 in an exemplary embodiment. Resource profile 206 indicates content providers 125-129 that have assets for UE 130 to download in advance for pre-fetch operations. Resource profile 206 also defines a percentage of UE resources allocated to each of the content providers 125-129 for downloading assets during a pre-fetch operation. The term "percentage of UE resources" may refer to a variety of things. In one example, UE resources may refer to time that is allocated for a pre-fetch operation, such as download time, processing time, air time, etc. For instance, if a pre-fetch operation is scheduled for 30 minutes, then the percentage of UE resources may refer to a percentage of the 30 minutes allocated to download assets from a particular content provider. In another example, UE resources may refer to memory that is allocated for a pre-fetch operation. For instance, if a pre-fetch operation is allowed to use 2

Gigabytes of memory space within the UE, then the percentage of UE resources may refer to a percentage of the 2 Gigabytes allocated to download assets from a particular content provider.

In the embodiment shown in FIG. 3, resource profile 206 specifies that 40% of the UE resources are allocated for downloading assets from content provider 125 during a pre-fetch operation. Resource profile 206 specifies that 20% of the UE resources are allocated for downloading assets from each of content providers 126-127. Resource profile 206 also specifies that 10% of the UE resources are allocated for downloading assets from each of content providers 128-129.

Resource profile 206 may also define the percentage of UE resources allocated per asset-type for a particular content provider. An "asset-type" refers to a type of media that is available for download, such as video, audio, digital pictures, etc. For example, resource profile 206 specifies that 20% of the UE resources allocated to content provider 125 (40% total) are allocated for video, 15% are allocated for audio, and 5% are allocated for digital pictures. Resource profile 206 may define the percentages per asset-type for each of content providers 126-129 in a similar manner. Also, resource profile 206 may define the percentage allocated per sub-asset-type (not shown in FIG. 3), where a sub-asset-type comprises any kind of subset of the asset-type. For example, the sub-asset-type may be the file format of the video, so that the 20% allocated for video may be further defined as 10% for .wmv files and 10% for .mpg files. Asset sub-types may also refer to other things, such as a sub-type of "friends" for a social networking type of content provider.

When UE 130 is scheduled for a pre-fetch operation, processing system 202 accesses resource profile 206 (which is referred to as an executable resource profile at this time) to determine how UE resources are allocated for the operation. Resource profile 206 specifies that 40% of UE resources are allocated to download assets from content provider 125 (20% for video, 15% for audio, and 5% for digital pictures). Processing system 202 also determines which assets are recommended for download from content provider 125. The recommended assets may be provided by recommended system 124 (see FIG. 1). For example, UE 130 may receive a file from recommender system 124 indicating the assets it predicts the end user will request at some point, or the recommended assets may be part of resource profile 206. When the recommended assets are identified, processing system 202 utilizes 20% of the UE resources downloading video assets from content provider 125, 15% of the UE resources downloading audio assets from content provider 125, and 5% of the UE resources downloading digital picture assets from content provider 125. Processing system 202 operates in a similar manner to download assets from content providers 126-129 based on the percentages allocated in resource profile 206. At the end of the pre-fetch operation, the assets are stored in the local memory 204 of UE 130.

According to the embodiments described herein, recommender system 124 is able to optimize the percentages allocated in resource profile 206. To do so, UE 130 transmits resource profile 206 to recommender system 124. Recommender system 124 may then adjust the percentages allocated in resource profile 206 as described in FIG. 4.

FIG. 4 is a flow chart illustrating a method 400 of adjusting resource profile 206 in an exemplary embodiment. The steps of method 400 will be described with reference to recommender system 124 in FIG. 1, but those skilled in the art will appreciate that method 400 may be performed in other networks and systems. The steps of the flow charts described herein are not all inclusive and may include other steps not shown. The steps may also be performed in an alternative order.

In step 402, recommender system 124 receives resource profile 206 from UE 130. In step 404, recommender system 124 adjusts the percentages of UE resources allocated to content providers 125-129 to generate an updated resource profile. Recommender system 124 may adjust the percentages of UE resources in resource profile 206 based on prior resource profiles for the end user of UE 130 and/or based on resource profiles for other end users. For example, one algorithm which may be used to adjust the percentages is based on prior resource profiles for the end user. Recommender system 124 stores resource profiles each time it recommends a new (updated) resource profile to UE 130. Thus, in step 404, recommender system 124 may identify the prior resource profiles for the end user, and calculate an average of the percentages in the prior resource profiles, such as an exponential moving average of the percentages in the prior resource profiles. Recommender system 124 may then adjust the percentages in resource profile 206 based on the average of the percentages in the prior resource profiles.

Another algorithm which may be used is based on resource profiles for other end users having similar tastes or interests as the end user of UE 130. Recommender system 124 stores resource profiles for multiple other end users. In step 404, recommender system 124 may identify a set of resource profiles for other end users that have similar tastes or interests as the end user. For instance, if resource profile 206 for the end user indicates that a percentage is allocated for downloads from Facebook, then recommender system 124 may identify a set of resource profiles for other end users that access Facebook. Recommender system 124 may then adjust the percentages in resource profile 206 based on the resource profiles for the other end users.

Yet another algorithm is based on resource profiles for other end users having similar demographics as the end user of UE 130. Thus, in step 404, recommender system 124 may identify a set of resource profiles for other end users that having similar demographics as the end user. For instance, if the end user is a male between the ages of 30-37, then recommender system 124 may identify a set of resource profiles for other end users that are also males between the ages of 30-37. Recommender system 124 may then calculate an average of the percentages in the resource profiles of the other end users. Recommender system 124 may then adjust the percentages in resource profile 206 based on the average of the percentages in the resource profiles for the other end users.

Any of the above algorithms or other algorithms may be used separately or combined to adjust the percentages in resource profile 206 for the end user.

After generating the updated resource profile for the end user, recommender system 124 transmits the updated resource profile to UE 130 in step 406 (see FIG. 4). Processing system 202 of UE 130 then stores the updated resource profile in memory 204. The next time UE 130 is scheduled for a pre-fetch operation, processing system 202 accesses the updated resource profile to determine how to allocate resources for the pre-fetch operation. UE 130 periodically sends its resource profile to recommender system 124 for updating. As recommender system 124 acquires more data regarding the resource profiles for the end user of UE 130 and other end users, recommender system 124 is able to more accurately update the resource profile for UE 130. Thus, the resource profile will become optimized for pre-fetch operations so that UE resources are allocated more effectively to download assets that the end user of UE 130 is most likely to request at some point.

Example

FIGS. 5-12 provide an example of updating the resource profile of an end user. To begin, FIG. 5 illustrates recommender system 124 in an exemplary embodiment. The structure shown for recommender system 124 is just one example, and it may have other configurations in other embodiments. Recommender system 124 includes an asset database 502, a profile database 504, a real-time recommendation element 506, and an offline recommendation element 508. Asset database 502 comprises a storage device that stores information on assets that are downloaded by UEs 130-132 in mobile network 100. For example, asset database 502 may store an asset ID along with a rating for the asset (implicit or explicit). Profile database 504 comprises a storage device that stores resource profiles for UEs 130-132 in mobile network 100.

Real-time recommendation element 506 comprises a device that adjusts resource profiles for end users, and may also predict assets that will be requested by end users. The new profile calculation is done as per FIG. 10 and uses both the nearest N neighbors and the weights associated with those N users.

Offline recommendation element 508 comprises a device that periodically runs a collaborative filtering algorithm to identify the nearest N neighbors for each end user, and may also split the end users into clusters. Offline recommendation element 508 may further calculate the similarity of the nearest N neighbors for each end user using the Pearson coefficient. For each end user, the set of nearest N neighbors and their similarity (weights) to the end user are stored. This offline calculation is done periodically (e.g., everyday). The algorithm to split users into clusters may be run less frequently than the algorithm which determines the nearest N neighbors.

Offline recommendation element 508 also calculates a predicted rating for assets for each end user. However, only the end users in the same cluster may be used to calculate this prediction. This calculation may be done as follows: finding the rating for each asset for the set of nearest N neighbors, and summing these ratings using the weights associated with the nearest N neighbors. Then, the set of assets are ranked in terms of the sum and the top k items are stored.

Assume for this example that UE 130 has entered the coverage area of mobile network 100, or has powered on. When this occurs, recommender system 124 will send an initial resource profile to UE 130 as shown in FIG. 6. FIG. 6 is a message diagram illustrating an initial authentication of UE 130 in an exemplary embodiment. When UE 130 powers on or registers with mobile network 100, UE 130 authenticates itself with recommender system 124 by transmitting a message to recommender system 124 that includes its ID, authentication certificates, and demographic information. Recommendation element 506 processes the authentication certificates in order to authenticate UE 130. If UE 130 is verified, then recommendation element 506 sends a request to profile database 504 for profiles of other end users in a similar demographic. Profile database 504 uses the demographic information for the end user of UE 130 to search for profiles of similar end users. Profile database 504 then sends the profiles to recommendation element 506. Recommendation element 506 then calculates an average of the percentages allocated in the profiles, and generates an initial resource profile for the end user of UE 130 based on the average. The initial resource profile is used by UE 130 for a pre-fetch operation. The resource profile shown in FIG. 3 may be one example of an initial resource profile.

Now that UE 130 has received the initial resource profile and stored it in memory, UE 130 is ready to execute a pre-fetch routine. FIG. 7 is a message diagram illustrating a pre-fetch operation in an exemplary embodiment. When the pre-fetch operation is scheduled, UE 130 processes the initial resource profile to determine how the operation is performed. One example of the initial resource profile is shown in FIG. 3. UE 130 then proceeds to download assets from content providers 125-129 based on the percentages allocated in the initial resource profile. For example, looking at FIG. 3, UE 130 will spend 20% of UE resources downloading video from content provider 125, 15% of UE resources downloading audio from content provider 125, and 5% of UE resources downloading digital pictures from content provider 125. UE 130 will also spend 20% of UE resources downloading assets from content provider 126, 20% of UE resources downloading assets from content provider 127, and so on. UE 130 downloads the assets in this manner until the pre-fetch operation has ended. UE 130 will then store the downloaded assets in a local memory (see memory 204 in FIG. 2).

The end user of UE 130 may then request to view the assets. For example, the end user may launch a web application, and select links to download certain assets from content providers 125-129. The end user may not know that one or more of the assets are stored locally. If the requests are for assets that are stored locally, then UE 130 will retrieve them from memory. This is done by generating a list of asset ID (URLs) and consulting this list whenever an asset is requested by the end user. If the asset ID (URL) matches an item on the list, then it is fetched from local memory. If the requests are for assets that are not stored locally, then UE 130 may have to retrieve them from content providers 125-129 in real-time over mobile network 100. UE 130 would refer to the network DNS obtained through DHCP when requesting the assets.

UE 130 monitors which assets are requested by the end user, and stores asset information (or an asset file) indicating the requested assets for UE 130. The asset information includes an asset ID and a rating. The asset ID comprises any information that identifies the asset, such as a URL or other network address, name, etc. The rating comprises any indication of how many times the end user requested the asset, how long the end user viewed an asset, etc. UE 130 then periodically sends the asset information to asset database 502. FIG. 8 illustrates UE 130 sending asset information to asset database 502 in an exemplary embodiment. When asset database 502 receives the asset information, it stores the asset information along with assets information provided by other UEs. Asset database 502 thus stores a list of asset IDs and an associated rating for assets requested by many end users. Recommendation elements 506 and 508 are able to use this information to identify which of the assets are most popular among the end users.

In addition to sending the asset information to recommender system 124, UE 130 also sends its resource profile to recommender system 124 for updating after an iteration of a pre-fetch operation. FIG. 9 is a message diagram illustrating UE 130 sending a resource profile to recommender system 124 for updating in an exemplary embodiment. UE 130 transmits its resource profile to profile database 504, which stores the resource profile for the end user along with any prior resource profiles. Recommendation element 506 then initiates a routine to generate an updated resource profile for the end user. FIG. 10 illustrates an updating routine in an exemplary embodiment. Looking at both FIGS. 9-10, recommendation element 506 retrieves prior resource profiles for the end user, and calculates an average of the prior resource profiles. More particularly, recommendation element 506 calculates an exponential moving average of each of the percentage allocations in the prior resource profiles. This results is a first profile that is multiplied by a weighted factor ($W_E$).

Recommendation element 506 also determines a profile based on a set of resource profiles for other end users having similar tastes or interests as the end user of UE 130. Offline recommendation element 508 may periodically identify the nearest N users having similar tastes or interests as the end user, as well as weights associated with those end users. Offline recommendation element 508 then sends this information to recommendation element 506. Recommendation element 506 looks up the resource profiles of the nearest N users, multiplies the percentages in the resource profiles with the appropriate weights, and normalizes the resulting profile. This results is a second profile that is multiplied by a weighted factor ($W_{CF}$).

Recommendation element 506 also determines a profile based on a set of resource profiles for other end users having similar demographics as the end user of UE 130. Offline recommendation element 508 may periodically identify resource profiles for other end users having similar demographics as the end user, and send those resource profiles to recommendation element 506. Recommendation element 506 then calculates an average of profiles for the other end users in a similar demographic. More particularly, recommendation element 506 calculates an average of each of the percentage allocations in the profiles for the other end users. This results in a third profile that is then multiplied by a weighted factor ($W_{DEMO}$). Recommendation element 506 then adds the first, second, and third profiles together, and normalizes the percentages to generate the updated resource profile. The sum of all the percentages for all asset types and sub-types should be 1 in a given profile. A profile may be multiplied by a weight by straightforward multiplying each value by that weight. Multiple profiles maybe multiplied by weights and then added together. If the resulting sum is not 1, then the profile is normalized by bringing the sum to 1. Recommendation element 506 then sends the updated resource profile to UE 130, as is shown in FIG. 9.

Figure 11:
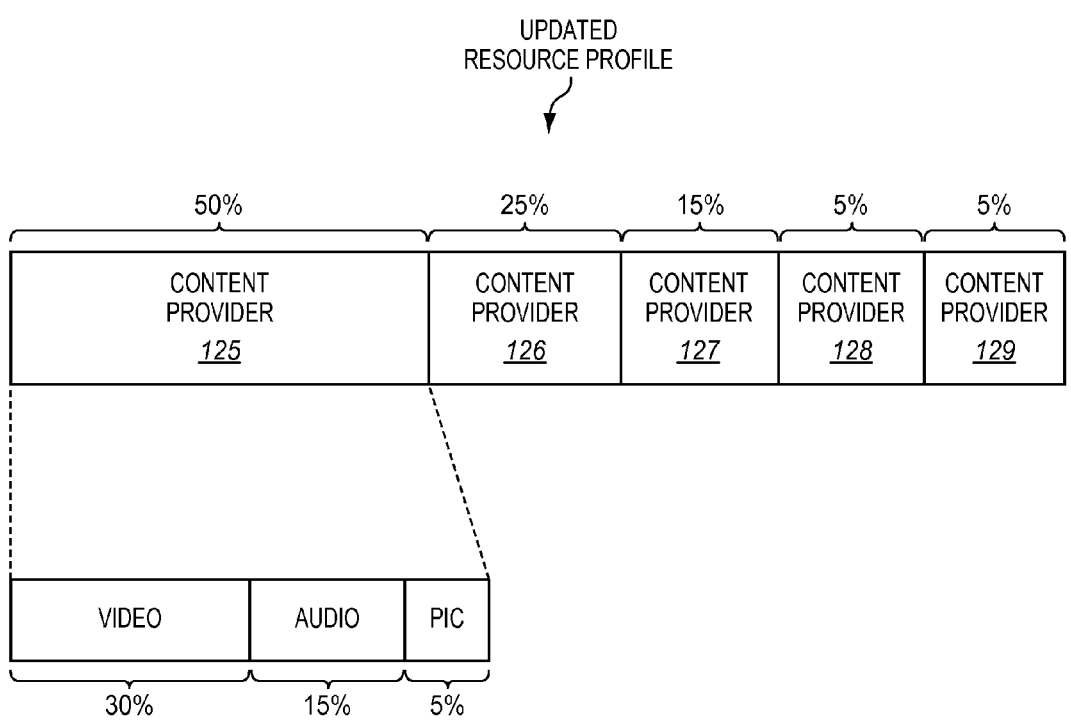
FIG. 11 illustrates an updated resource profile in an exemplary embodiment.

The next time UE 130 initiates a pre-fetch operation, UE 130 uses the updated resource profile for downloading the assets from content providers 125-129. FIG. 11 illustrates an updated resource profile in an exemplary embodiment. Comparing the profiles in FIG. 3 and FIG. 11, the percentage allocated to content provider 125 was adjusted from 40% to 50%. The percentage allocated to content provider 126 was adjusted from 20% to 25%, the percentage allocated to content provider 127 was adjusted from 20% to 15%, and the percentages allocated to content providers 128-129 was adjusted from 10% to 5%. Thus, in the next iteration of a pre-fetch operation, UE 130 will dedicate more resources to pre-fetching assets from content providers 125-126 than in the prior pre-fetch operation. This process of updating resource profiles for the end user of UE 130 occurs periodically to optimize the percentages allocated within the resource profile.

Figure 12:
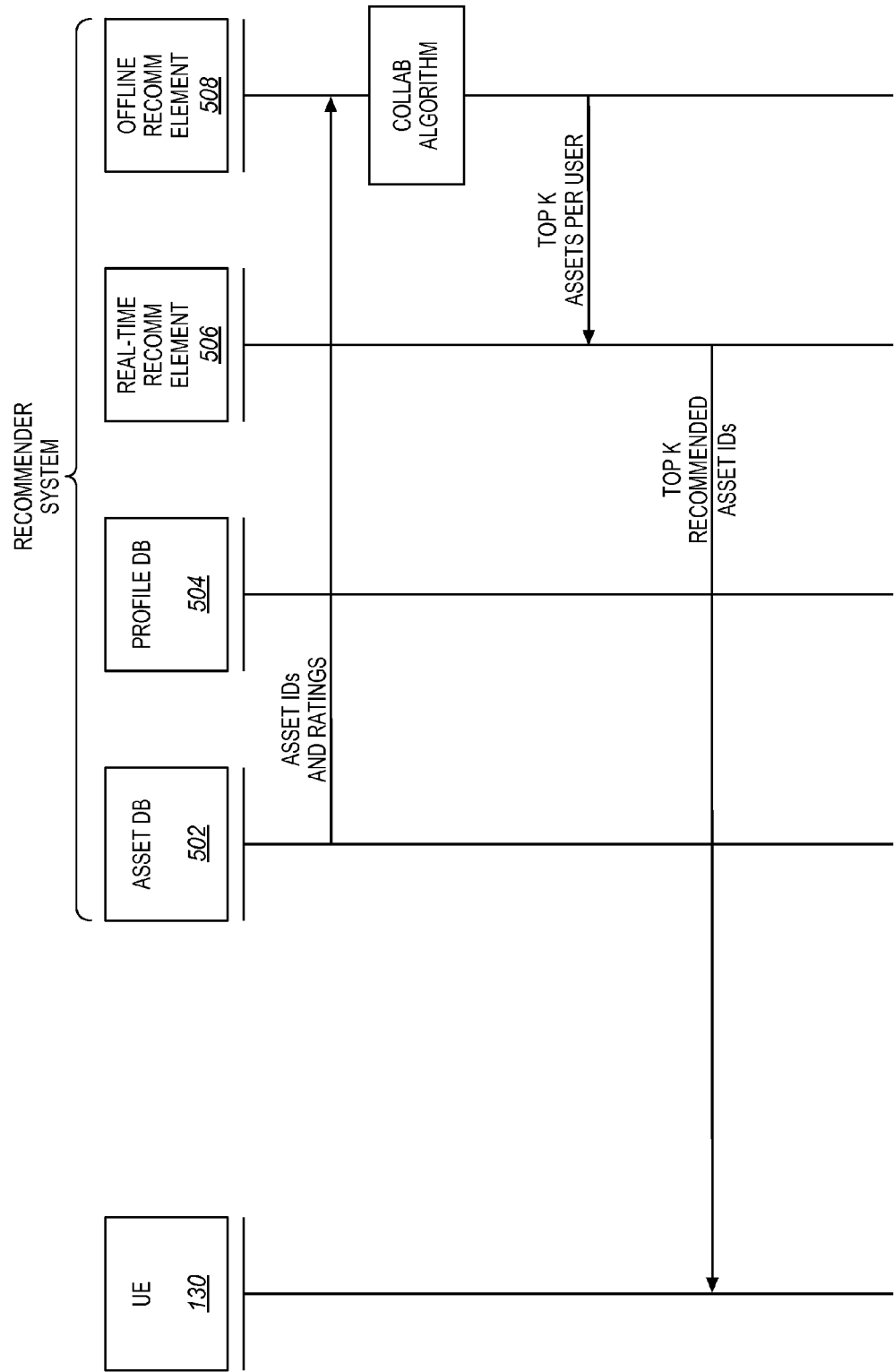
FIG. 12 is a message diagram illustrating a recommendation device predicting assets in an exemplary embodiment.

In addition to updating the resource profile for the end user of UE 130, recommendation element 506 may also predict which assets the end user may request. FIG. 12 is a message diagram illustrating recommending device 506 predicting assets in an exemplary embodiment. Recommendation element 508 periodically retrieves assets IDs and ratings from asset database 502. Recall that recommendation element 508 calculates the top k items most likely to be requested by a given user and stores them on a periodic basis. Recommendation element 506 then sends the recommended (top k) asset IDs to UE 130 so that UE 130 may pre-fetch these recommended assets during the next pre-fetch operation.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof

The invention claimed is:

1. A system comprising:
a recommender system operable to receive a resource profile from user equipment (UE) of an end user, wherein the resource profile indicates content providers that have assets for the UE to download in advance during a pre-fetch operation for local storage of the assets on the UE, and defines a percentage of UE resources allocated to each of the content providers for downloading the assets during the pre-fetch operation;
the recommender system further operable to adjust the percentages of the UE resources in the resource profile to generate an updated resource profile, and to transmit the updated resource profile to the UE for use in at least one subsequent pre-fetch operation.

2. The system of claim 1 wherein:
the recommender system is further operable to adjust the percentages of the UE resources in the resource profile based on at least one of:
percentages in prior resource profiles for the end user; and
percentages in resource profiles for other end users.

3. The system of claim 1 wherein:
the recommender system is further operable to identify a plurality of prior resource profiles for the end user, to calculate an average of percentages in the prior resource profiles, and to adjust the percentages in the resource profile for the end user based on the average of the percentages in the prior resource profiles.

4. The system of claim 3 wherein:
the recommender system is further operable to identify a first set of resource profiles for other end users having similar interest as the end user, and to adjust the percentages in the resource profile for the end user based on percentages in the first set of resource profiles.

5. The system of claim 4 wherein:
the recommender system is further operable to identify a second set of resource profiles for other end users having similar demographics as the end user, to calculate an average of percentages in the second set of resource profiles, and to adjust the percentages in the resource profile for the end user based on the average of the percentages in second set of resource profiles.

6. The system of claim 5 wherein:
the recommender system is further operable to add the average of the percentages in the prior resource profiles, the percentages in the first set of resource profiles, and the average of the percentages in second set of resource profiles to generate the updated resource profile for the end user.

7. The system of claim 1 wherein the percentage of UE resources allocated to each of the content providers comprises:
the percentage of UE processing time allocated to each of the content providers for downloading assets from the content providers during the pre-fetch operation.

8. The system of claim 1 wherein the percentage of UE resources allocated to each of the content providers comprises:
the percentage of UE memory allocated to each of the content providers for downloading assets from the content providers during the pre-fetch operation.

9. A method comprising:
receiving a resource profile from user equipment (UE) of an end user, wherein the resource profile indicates content providers that have assets for the UE to download in advance during a pre-fetch operation for local storage of the assets on the UE, and defines a percentage of UE resources allocated to each of the content providers for downloading the assets during the pre-fetch operation;
adjusting the percentages of the UE resources in the resource profile to generate an updated resource profile; and
transmitting the updated resource profile to the UE for use in at least one subsequent pre-fetch operation.

10. The method of claim 9 wherein adjusting the percentages of the UE resources in the resource profile comprises adjusting the percentages based on at least one of:
percentages in prior resource profiles for the end user; and
percentages in resource profiles for other end users.

11. The method of claim 9 wherein adjusting the percentages of the UE resources in the resource profile comprises:
identifying a plurality of prior resource profiles for the end user;
calculating an average of percentages in the prior resource profiles; and
adjusting the percentages in the resource profile for the end user based on the average of the percentages in the prior resource profiles.

12. The method of claim 11 wherein adjusting the percentages of the UE resources in the resource profile comprises:
identifying a first set of resource profiles for other end users having similar interest as the end user; and
adjusting the percentages in the resource profile for the end user based on percentages in the first set of resource profiles.

13. The method of claim 12 wherein adjusting the percentages of the UE resources in the resource profile comprises:
identifying a second set of resource profiles for other end users having similar demographics as the end user;
calculating an average of percentages in the second set of resource profiles; and
adjusting the percentages in the resource profile for the end user based on the average of the percentages in second set of resource profiles.

14. The method of claim 13 wherein adjusting the percentages of the UE resources in the resource profile to generate the updated resource profile comprises:
adding the average of the percentages in the prior resource profiles, the percentages in the first set of resource profiles, and the average of the percentages in second set of resource profiles to generate the updated resource profile for the end user.

15. The method of claim 9 wherein the percentage of UE resources allocated to each of the content providers comprises:
the percentage of UE processing time allocated to each of the content providers for downloading assets from the content providers during the pre-fetch operation.

16. The method of claim 9 wherein the percentage of UE resources allocated to each of the content providers comprises:
the percentage of UE memory allocated to each of the content providers for downloading assets from the content providers during the pre-fetch operation.

17. A computer readable medium tangibly embodying programmed instructions which, when executed by a computer system, are operable for performing a method of adjusting resource profiles of User Equipment (UE) of a mobile network that are used to pre-fetch assets from content providers, the method comprising:
receiving a resource profile from the UE of an end user, wherein the resource profile indicates content providers that have assets for the UE to download in advance during a pre-fetch operation for local storage of the assets on the UE, and defines a percentage of UE resources allocated to each of the content providers for downloading the assets during the pre-fetch operation;
adjusting the percentages of the UE resources in the resource profile to generate an updated resource profile; and
transmitting the updated resource profile to the UE for use in at least one subsequent pre-fetch operation.

18. The computer readable medium of claim 17 wherein adjusting the percentages of the UE resources in the resource profile comprises adjusting the percentages based on at least one of:
percentages in prior resource profiles for the end user; and
percentages in resource profiles for other end users.

19. The computer readable medium of claim 17 wherein adjusting the percentages of the UE resources in the resource profile comprises:
identifying a plurality of prior resource profiles for the end user;
calculating an average of percentages in the prior resource profiles; and
adjusting the percentages in the resource profile for the end user based on the average of the percentages in the prior resource profiles.

20. The computer readable medium of claim 17 wherein adjusting the percentages of the UE resources in the resource profile comprises:

identifying a first set of resource profiles for other end users having similar interest as the end user;
identifying a second set of resource profiles for other end users having similar demographics as the end user;
calculating an average of percentages in the second set of resource profiles; and
adjusting the percentages in the resource profile for the end user based on percentages in the first set and second set of resource profiles.

\* \* \* \* \*